United States Patent
Nicoll

(10) Patent No.: US 9,156,712 B2
(45) Date of Patent: Oct. 13, 2015

(54) THERMAL DESALINATION

(75) Inventor: Peter Nicoll, Guildford (GB)

(73) Assignee: Surrey Aquatechnology Ltd., Guildford (GB)

( * ) Notice: Subject to any disclaimer, the term of this patent is extended or adjusted under 35 U.S.C. 154(b) by 699 days.

(21) Appl. No.: 13/504,225

(22) PCT Filed: Oct. 26, 2010

(86) PCT No.: PCT/GB2010/001984
§ 371 (c)(1),
(2), (4) Date: May 23, 2012

(87) PCT Pub. No.: WO2011/051662
PCT Pub. Date: May 5, 2011

(65) Prior Publication Data
US 2012/0234664 A1   Sep. 20, 2012

(30) Foreign Application Priority Data
Oct. 28, 2009 (GB) .................... 0918916.8

(51) Int. Cl.
| | | |
|---|---|---|
| C02F 1/04 | (2006.01) | |
| C02F 1/06 | (2006.01) | |
| C02F 1/44 | (2006.01) | |
| C02F 5/00 | (2006.01) | |
| C02F 103/08 | (2006.01) | |

(52) U.S. Cl.
CPC . C02F 1/06 (2013.01); C02F 1/041 (2013.01); C02F 1/043 (2013.01); C02F 1/048 (2013.01); C02F 1/441 (2013.01); C02F 1/445 (2013.01); C02F 5/00 (2013.01); C02F 2103/08 (2013.01)

(58) Field of Classification Search
CPC ............ C02F 1/04; C02F 1/041; C02F 1/043; C02F 1/048; C02F 1/06; C02F 1/445
USPC ..................... 203/10; 210/650, 652
See application file for complete search history.

(56) References Cited

U.S. PATENT DOCUMENTS

| | | | | |
|---|---|---|---|---|
| 7,560,029 | B2 * | 7/2009 | McGinnis | 210/644 |
| 7,914,680 | B2 * | 3/2011 | Cath et al. | 210/644 |
| 8,083,942 | B2 * | 12/2011 | Cath et al. | 210/321.6 |
| 8,545,681 | B2 * | 10/2013 | Shapiro et al. | 203/10 |
| 8,652,333 | B2 * | 2/2014 | Nicoll | 210/644 |
| 2006/0144789 | A1 * | 7/2006 | Cath et al. | 210/641 |
| 2007/0240446 | A1 * | 10/2007 | Holtzapple et al. | 62/333 |

(Continued)

FOREIGN PATENT DOCUMENTS

| | | |
|---|---|---|
| GB | 2443802 A | 5/2008 |
| JP | 61-141985 A | 6/1986 |
| WO | 2008152749 A1 | 12/2008 |

*Primary Examiner* — In Suk Bullock
*Assistant Examiner* — Jonathan Miller
(74) *Attorney, Agent, or Firm* — Whyte Hirschboeck Dudek S.C.

(57) ABSTRACT

A thermal desalination process comprising: introducing a feed solution into a thermal separation unit, distilling the feed solution in the thermal separation unit to produce a distillate stream and a residual stream having a higher solute concentration than the feed solution, contacting a portion of the residual stream from the thermal separation unit with one side of a selectively permeable membrane, contacting the opposite side of the selectively permeable membrane with a portion of the feed solution, such that water flows across the membrane to dilute the residual stream by direct osmosis, and introducing at least a portion of the diluted residual stream into the thermal separation unit.

9 Claims, 1 Drawing Sheet

(56) References Cited

U.S. PATENT DOCUMENTS

| | | | |
|---|---|---|---|
| 2010/0206743 A1* | 8/2010 | Sharif | 205/687 |
| 2011/0203994 A1* | 8/2011 | McGinnis et al. | 210/650 |
| 2011/0278226 A1* | 11/2011 | Nicoll | 210/639 |
| 2012/0267306 A1* | 10/2012 | McGinnis et al. | 210/637 |
| 2013/0032538 A1* | 2/2013 | Iyer | 210/648 |

* cited by examiner

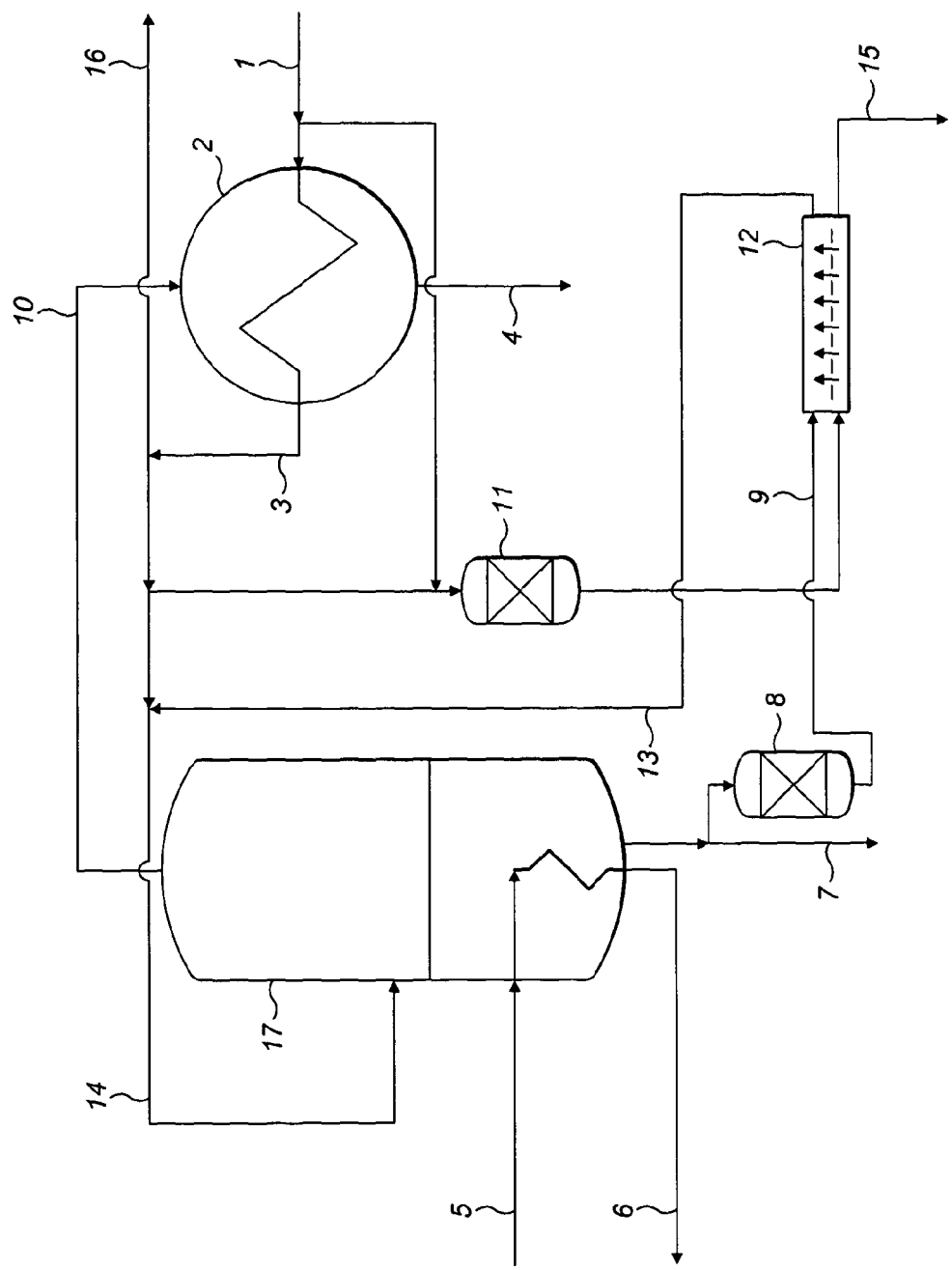

THERMAL DESALINATION

The present invention relates to a thermal desalination process.

Various methods for desalinating seawater are known. For example, water may be separated from seawater using membrane techniques, such as reverse osmosis. Alternatively, thermal separation methods may be employed. Examples of such thermal separation techniques include multi-stage flash distillation (MSF), multi-effect distillation (MED) and vapour compression distillation (VC).

Seawater contains ions, such as calcium, magnesium and sulphate ions, that tend to deposit in thermal separation units as scale. Chemical additives may be added to reduce scale formation, but this can add to the cost of the overall process. Furthermore, although scale formation may be reduced by reducing the maximum temperature to which the seawater is heated (top brine temperature), this significantly reduces the effectiveness of the desalination process.

A number of attempts have been made to reduce the risk of scale formation. In GB 2,443,802, for example, the seawater feed stream is passed through a nanofiltration or reverse osmosis membrane before being introduced into the thermal separation unit. The nanofiltration or reverse osmosis membrane retains at least some of the scale-forming ions, softening the seawater prior to distillation. Although the technique is effective, it requires the seawater to be pressurised prior to contact with the membrane, significantly increasing the costs of the overall process.

According to the present invention, there is provided a thermal desalination process comprising:
 introducing a feed solution into a thermal separation unit,
 distilling the feed solution in the thermal separation unit to produce a distillate stream and a residual stream having a higher solute concentration than the feed solution,
 contacting a portion (i.e. not all) of the residual stream from the thermal separation unit with one side of a selectively permeable membrane,
 contacting the opposite side of the selectively permeable membrane with a portion of the feed solution, such that water flows across the membrane to dilute the residual stream by direct osmosis, and
 introducing at least a portion of the diluted residual stream into the thermal separation unit.

As explained above, a feed solution, such as seawater, is introduced into a thermal separation unit where the feed solution is distilled to produce a distillate stream and a residual stream having a higher solute concentration than the feed solution. The distillate stream is typically water and is generally removed from the thermal separation unit for further purification or direct use. A portion (i.e. not all) of the residual stream is typically removed as blowdown or brine, while a portion, for example in the case of the multi-stage flash process, is typically re-circulated through the heat recovery section, for example, as a means of recovering heat from the vapour produced within the flash chambers of the heat recovery section.

In the process of the present invention, a portion of the residual stream is contacted with one side of a selectively permeable membrane. The opposite side of the membrane is contacted with a portion of the feed solution. As the residual stream has a higher solute concentration than the feed solution, water from the feed solution flows across the membrane to dilute the residual solution by direct osmosis. The feed solution, therefore, need not be pressurised to high pressures to induce solvent flow. Although liquid solvent (e.g. water) is allowed to flow across the membrane, the membrane retains at least some of the scale-forming ions, such as calcium, magnesium and sulphate ions. The diluted residual solution, therefore, is softened relative to the original feed solution and is introduced to the thermal separation unit for distillation. The overall feed into the thermal separation unit, therefore, is softened relative to the original feed solution. In this way, the maximum temperature to which the feed solution is heated (e.g. top brine temperature) may be increased, improving the effectiveness of the overall process. The amount of anti-scalant employed in the thermal separation unit, therefore, may also be reduced, improving the cost-effectiveness of the process.

Preferably, the process of the present invention further comprises heating the portion of feed solution prior to contact with the selectively permeable membrane. This may be advantageous as the permeability of the solvent (e.g. liquid water) through the membrane may be improved at elevated temperatures. The portion of feed solution may be at a temperature in the range of 5 to 50° C., preferably 15 to 45° C., more preferably 25 to 40° C., upon contact with the membrane. The heating step may be carried out using heat from the thermal separation unit. Alternatively or additionally, the residual solution may be cooled prior to contact with the membrane. The residual solution is typically at a temperature of 15 to 60° C., preferably 25 to 50° C., more preferably 30 to 40° C. when contacted with the membrane.

The portion of feed solution may be treated with an anti-scaling agent, corrosion inhibitor, dispersant and/or an anti-microbial agent prior to contact with the selectively permeable membrane. The portion of feed solution may also be treated by other pre-treatment techniques, such as filtration, micro filtration or ultra filtration to remove any larger impurities from the feed solution that might otherwise clog or foul the membrane.

The portion of the residual stream may be treated with an anti-scaling agent, corrosion inhibitor, dispersant and/or an anti-microbial agent prior to contact with the selectively permeable membrane. The portion of the residual stream may also be treated by other pre-treatment techniques, such as filtration, micro filtration or ultra filtration to remove any larger impurities from the feed solution that might otherwise clog or foul the membrane.

Any suitably selective membrane may be used in the direct osmosis step. An array of membranes may be employed. Suitable membranes include cellulose acetate (CA) and cellulose triacetate (CTA) (such as those described in McCutcheon et al., Desalination 174 (2005) 1-11) and polyamide (PA) membranes. The membrane may be planar or take the form of a tube or hollow fibre. Thin membranes may be employed, particularly, when a high pressure is not applied to induce solvent flow across the membrane. If desired, the membrane may be supported on a supporting structure, such as a mesh support.

In one embodiment, one or more tubular membranes may be disposed within a housing or shell. The feed solution may be introduced into the housing, whilst the residual solution may be introduced into the tubes. As the solvent concentration of the feed solution is higher than that of the residual solution, solvent (liquid) will diffuse across the membrane from the feed solution into the residual solution. The diluted residual solution may be recovered from the interior of the tubes, whilst the concentrated feed solution may be removed from the housing (or vice-versa).

When a planar membrane is employed, the sheet may be rolled such that it defines a spiral in cross-section.

The pore size of the membrane may be selected to allow solvent molecules (e.g. water) to flow across the membrane but to retain scale-forming ions, such as calcium, magnesium and sulphate ions. Typical pore sizes range from 1 to 100 Angstroms, preferably 2 to 50 Angstroms, for example 10 to 40 Angstroms. Pore size may be inferred by using any suitable technique.

Although not essential, the portion of feed solution may be pressurised and contacted with the membrane at a pressure of less than 3 MPa, typically from 0.1 to 1 MPa, preferably 0.1 to 0.5 MPa, and more preferably 0.1 to 0.3 MPa.

Any suitable feed solution may be used in the process of the present invention. Preferably, the feed solution is seawater or brackish water.

Any suitable thermal separation unit may be used in the process of the present invention. Preferably, the thermal separation unit is selected from multistage flash distillation apparatus, a multi-effect distillation apparatus and a vapour compression apparatus.

The portion of the residual stream that is introduced to the membrane may be treated to remove particulates or other undesirable substances or ions prior to being introduced to the membrane. Any suitable technique may be used, such as filtration, micro filtration, ultra filtration, nano filtration or absorption.

The feed solution may also be treated to remove particulates or other undesirable substances or ions prior to being introduced to the membrane. Any suitable technique may be used, such as filtration, micro filtration, ultra filtration, nano filtration or absorption.

These and other aspects of the invention will now be described with reference to the accompanying Figure, in which:

FIG. 1 is a schematic diagram of an apparatus for carrying out an embodiment of the process of the present invention.

In FIG. 1 the numbering corresponds to the following features:

1. Cooling water and feed supply
2. Condenser
3. Heated feedwater
4. Distillate product
5. Steam supply
6. Steam condensate return to boiler system
7. Reject brine/blowdown
8. Osmotic agent/brine pre-treatment system
9. Brine/Osmotic agent feed
10. Vapour
11. Feedwater pre-treatment system
12. Membrane system
13. Diluted brine/osmotic agent
14. Feedwater/diluted brine
15. Concentrated feedwater
16. Cooling water discharge
17. Evaporator FIG. 1 shows a schematic version of one embodiment of the thermal desalination process of the present invention. The cooling water and feed supply (1) is introduced into the condenser (2) where it is heated by the vapour (10) which is condensed to form distillate product (10).

In the evaporator (17), the feedwater/diluted brine (14) is partially evaporated by the steam (5) to produce a vapour (10) which is passed to the condenser (2). The steam (5) is condensed to from condensate (6), which is returned to the boiler system.

The reject brine (7) having a higher solute concentration then the feed solution (1) is removed from the evaporator (17), with a portion (9) is contacted with one side of a selectively permeable membrane in the membrane system (12). Optionally the osmotic agent/brine (9) from the evaporator (17) is treated in the osmotic agent/brine pre-treatment system (8) prior to introduction to one side of the selectively permeable membrane in the membrane system (12). The other side of the selectively permeable membrane in the membrane system (12) is contacted with a portion of the feed stream (1), such that water flows across the membrane to dilute the brine/osmotic agent feed (9) stream by direct osmosis. Prior to introducing the portion of feed stream (1) into membrane system (12), the feed stream may be passed through a feedwater pre-treatment system (11). The residual feedwater stream is removed from the membrane system (12) as concentrated feedwater (15).

The invention claimed is:

1. A thermal desalination process comprising:
   introducing a feed solution into a thermal separation unit,
   distilling the feed solution in the thermal separation unit to produce a distillate stream and a residual stream having a higher solute concentration than the feed solution,
   removing and discarding a first portion of the residual stream from the thermal separation unit as blowdown;
   first contacting, after the removing and discarding, a second portion of the residual stream from the thermal separation unit with one side of a selectively permeable membrane;
   second contacting the opposite side of the selectively permeable membrane with a portion of the feed solution, such that water flows across the membrane to dilute the residual stream by direct osmosis;
   removing, after the second contacting, a concentrated feed solution from the opposite side of the selectively permeable membrane; and
   introducing at least a portion of the diluted residual stream, with the feed solution, into the thermal separation unit.

2. A process as claimed in claim 1, wherein the feed solution is seawater or brackish water.

3. A process as claimed in claim 1, wherein the thermal separation unit is selected from the group consisting of multistage flash distillation apparatus, a multi-effect distillation apparatus and a vapour compression apparatus.

4. A process as claimed in claim 1, which comprises heating the portion of feed solution prior to contact with the selectively permeable membrane.

5. A process as claimed in claim 1, wherein the portion of feed solution is treated with an anti-scaling agent and/or an anti-microbial agent prior to contact with the selectively permeable membrane.

6. A process as claimed in claim 1, wherein the portion of the residual solution is treated with an anti-scaling agent and/or an anti-microbial agent prior to contact with the selectively permeable membrane.

7. A process as claimed in claim 1, wherein the portion of the residual stream is treated to remove particulate or organic substances prior to introduction to the membrane.

8. A process as claimed in claim 1, wherein the portion of the feed solution is treated to remove particulate, or organic substances prior to introduction to the membrane.

9. A process as claimed in claim 1, wherein the selectively permeable membrane has an average pore size of 10 to 40 Angstroms.

* * * * *